United States Patent [19]
Brown

[11] 3,813,992
[45] June 4, 1974

[54] DUAL FLUID PRESSURE MOTOR

[76] Inventor: Curtis Leroy Brown, West Dundee, Ill.

[22] Filed: Mar. 29, 1972
(Under Rule 47)

[21] Appl. No.: 239,165

[52] U.S. Cl. ................ 91/189, 91/369 B, 91/391, 92/48
[51] Int. Cl. ................ F15b 9/10, F01b 19/00
[58] Field of Search.. 91/189, 369 A, 369 B, 369 R, 91/391; 92/48, 49; 60/552

[56] References Cited
UNITED STATES PATENTS

| | | | |
|---|---|---|---|
| 2,989,035 | 6/1961 | Stelzer | 91/369 B |
| 3,013,535 | 12/1961 | Schultz | 91/369 B |
| 3,102,453 | 9/1963 | Brooks et al. | 91/369 B |
| 3,348,454 | 10/1967 | Kahn et al. | 91/189 |
| 3,388,635 | 6/1968 | Hager | 91/369 A |
| 3,482,485 | 12/1969 | Abbott | 91/369 R |
| 3,502,001 | 3/1970 | Moore | 91/189 |
| 3,628,422 | 12/1971 | Acre | 91/369 B |

Primary Examiner—Paul E. Maslousky
Attorney, Agent, or Firm—Irvin L. Groh

[57] ABSTRACT

A fluid pressure motor power brake mechanism employing two power systems each under the control of separate valve means to apply the resultant power force of both power brake systems to a hydraulic system for actuating the brakes at the wheels of a vehicle in such a manner that disabling of one or the other of the power brake systems leaves the remaining power brake system to apply power braking force to the hydraulic braking system associated with the wheels of a vehicle.

12 Claims, 5 Drawing Figures

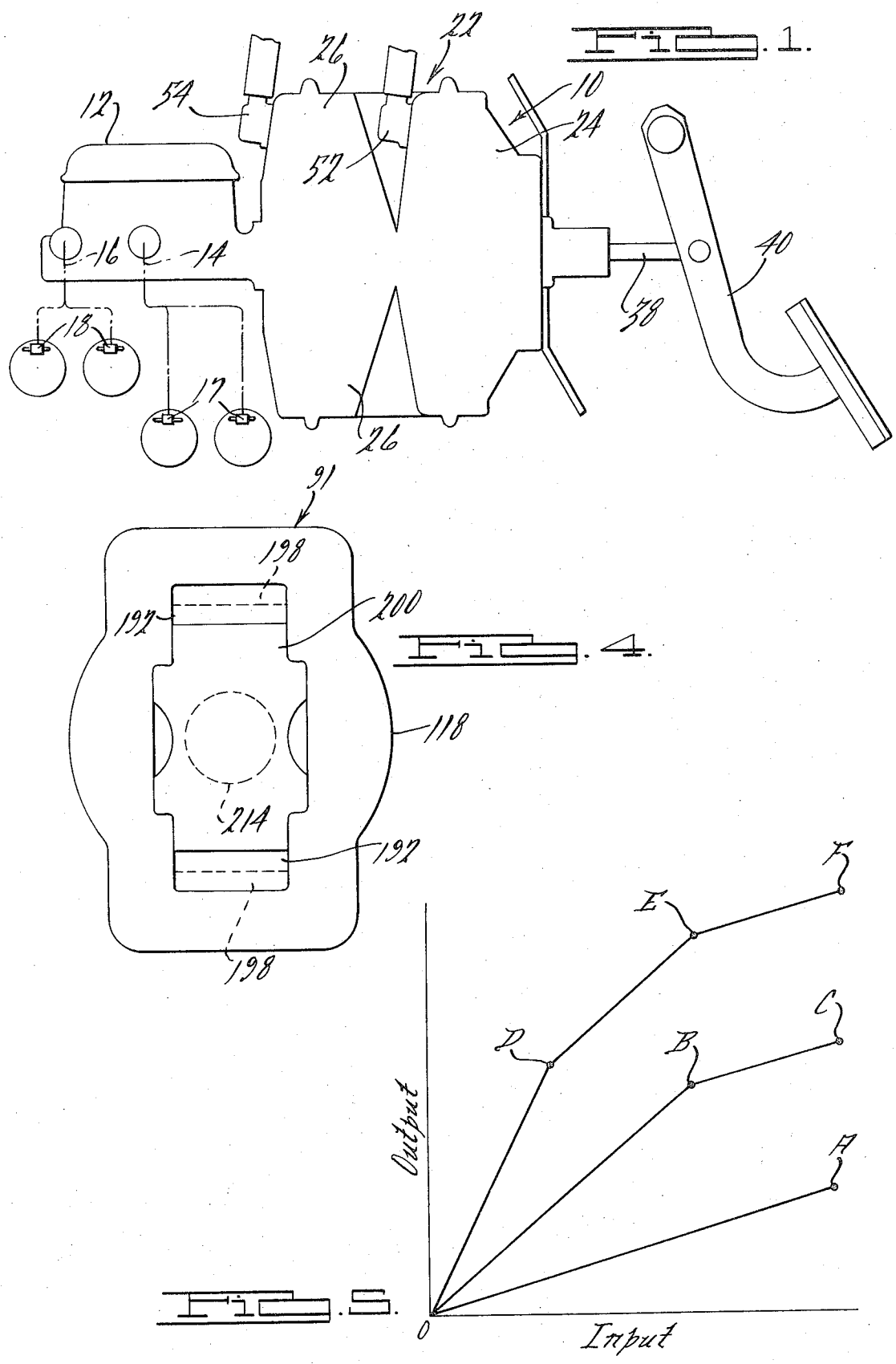

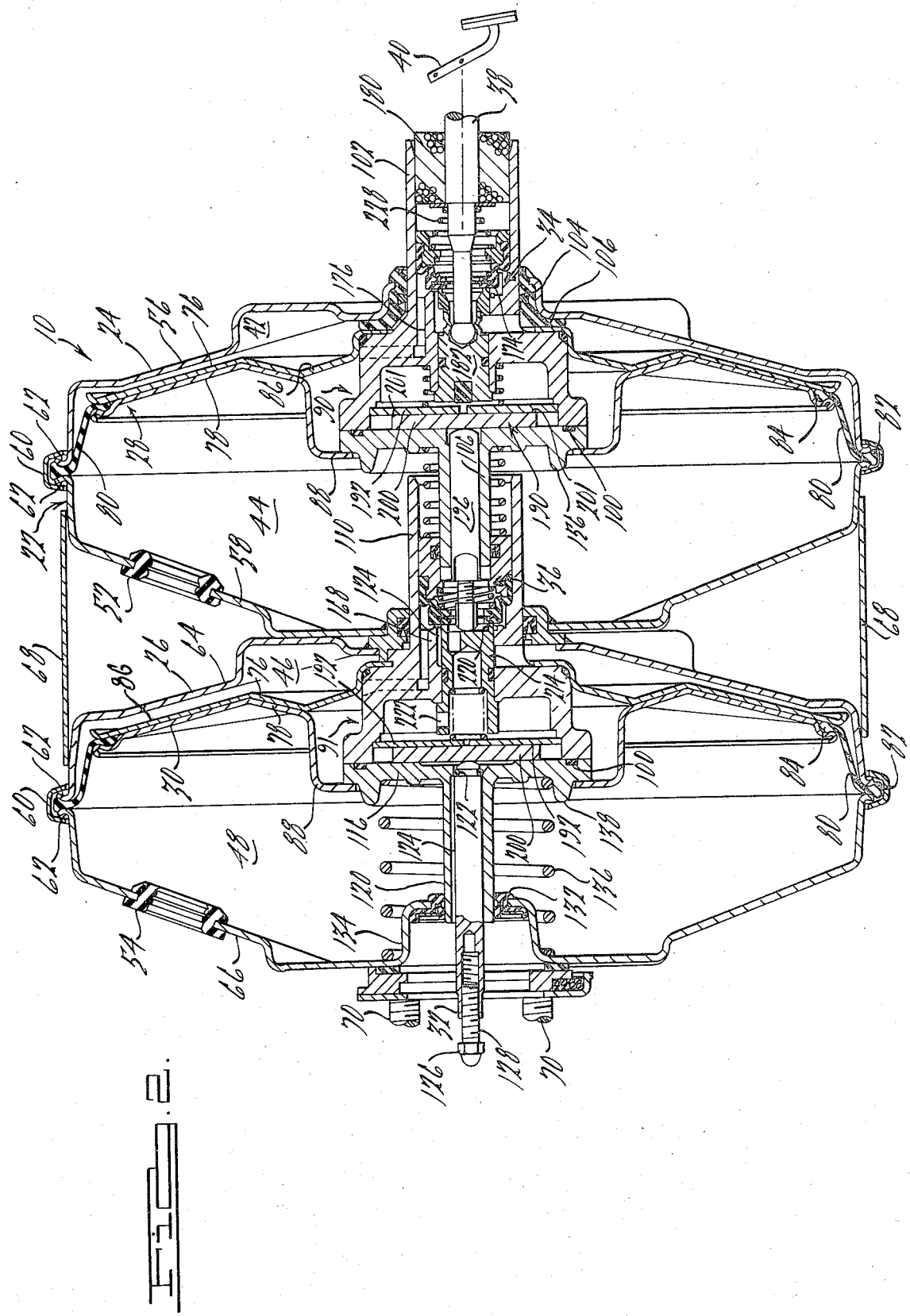

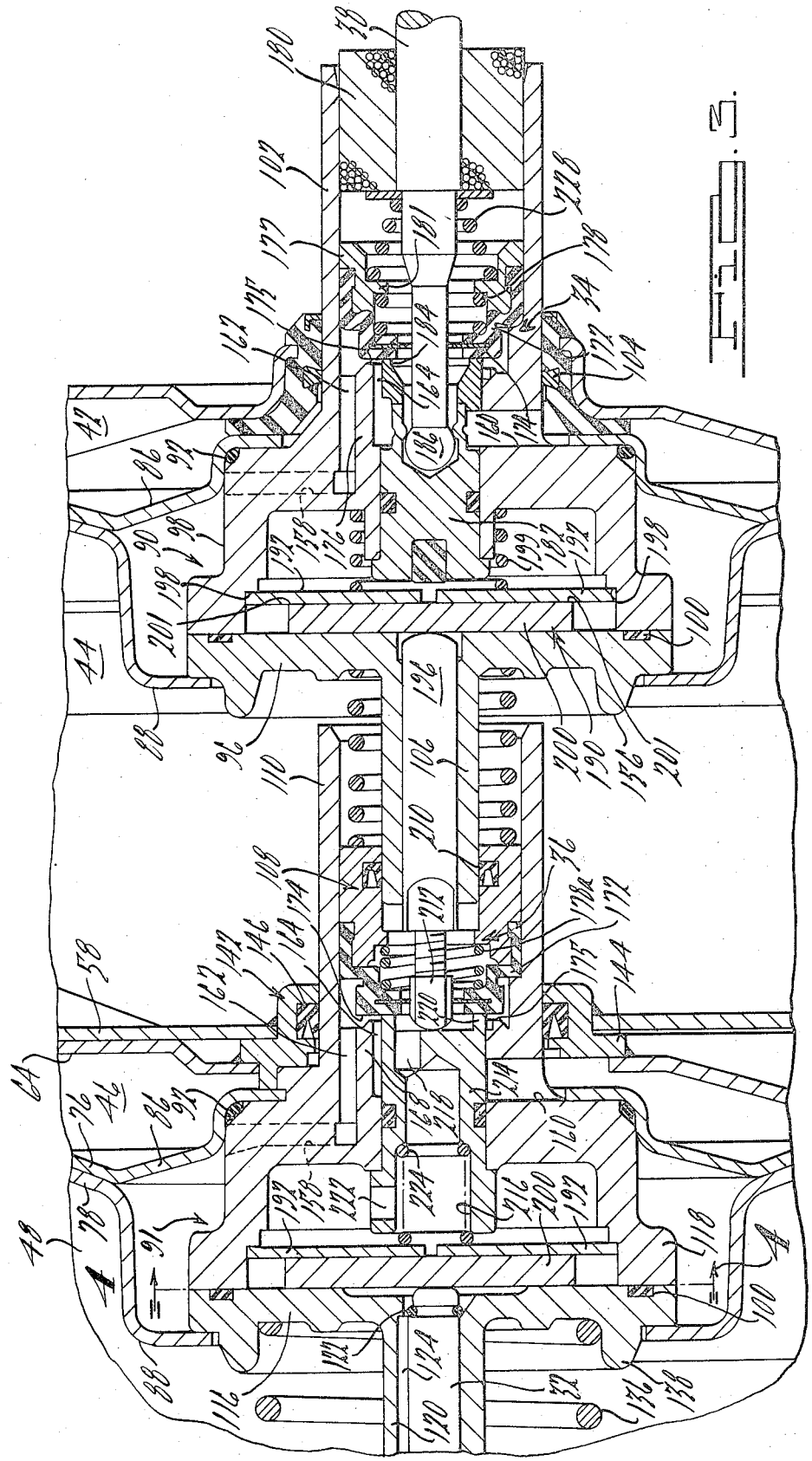

DUAL FLUID PRESSURE MOTOR

SUMMARY OF THE INVENTION

This invention relates to fluid pressure motor or power brake systems for automotive vehicles and more particularly to a dual power brake incorporating two power systems so arranged that failure of one or the other of the power systems to operate leaves the remaining system intact to operate the brakes.

In hydraulic brake systems used on vehicles, it is now required to use a dual hydraulic brake system of a type in which a hydraulic master cylinder controls the hydraulic fluid pressure in two separate hydraulic systems, one of which is associated with the wheels of one axle of the vehicle and the other system with the wheels of the other axle of the vehicle so that failure in one of the hydraulic systems leaves the other system operable to actuate the remaining brakes of the vehicle.

It also is common to use such dual hydraulic systems with power brake systems by which a separate power source is used to supplement the hydraulic force and reduce the effort required by an operator to actuate the brakes. In some vehicles, particularly trucks and heavier vehicles, the power not only reduces the effort required by the operator to produce braking but also is necessary to produce the required total force to effectively brake the vehicle. Failure of the power system requires stopping of the vehicle with manual effort alone which may be insufficient for a satisfactory, safe stop.

The requirement for safety and enabling legislation have made it necessary to provide more than one power system so that if one of the systems is rendered inoperative, the remaining power system or systems is available for at least partial power braking. In an effort to comply with such requirements, two power units have been used each having its own hydraulic slave cylinder for actuating a separate hydraulic system, one of which operates the brakes on one vehicle axle and the other of which operates the brakes on the other vehicle axle. As a result, failure of one of the power units or its source of power leaves the other power unit and its associated hydraulic system available for at least partial braking of the vehicle. In such systems, the two power units are simultaneously actuated by a third hydraulic system which can include the usual dual master cylinder, one section of which controls the operation of one of the power units and the other section which controls the operation of the other of the power units. One of the characteristics of such systems is that failure of one of the power systems results in full power braking in the other system, that is, loss of braking at one axle still leaves full power braking at the other axle.

From a vehicle control standpoint, it is believed to be more effective to provide a system in which loss of power to one of a pair of power systems reduces the power by approximately one-half but results in power braking of both of the axles by the remaining power brake unit. In other words, it is considered better to have power braking available to all axles and wheels of vehicle even though it is at a reduced amount than to have full power braking for only one of the axles. The latter type of braking can result in dangerous control problems such as skidding.

The prior art systems employing separate hydraulic circuits for separate axles and an additional hydraulic system to control the power brake unit complicate the hydraulic circuitry unduly and it is thought to be more desirable to provide a double power brake mechanism which is controlled directly by the foot of the operator and which applies the resultant controlled power to the usual hydraulic braking circuit incorporating a dual master cylinder.

It is an object of the present invention to overcome the aforementioned as well as other disadvantages of prior double power brake systems of the indicated character and to provide an improved power brake mechanism employing dual power sections such that failure of one of the sections leaves the other section operative to apply the brakes at the wheels of the vehicle.

Another object of the invention is to provide an improved power brake mechanism employing more than one power system in which failure of both of the power systems makes it possible to apply the hydraulic brakes by manual effort.

It is still another object of the invention to provide an improved dual power brake system which may be readily varied so that the resultant output produced by the power brake unit can be made to correspond to various characteristics of different brake systems.

It is another object of the invention to provide an improved dual power brake system greatly simplifying the hydraulic connections required for braking action.

It is still another object of the invention to provide an improved dual power brake mechanism that is economical and commercially feasible to manufacture and which will comply with test and operating requirements of safety legislation.

The above as well as other objects and advantages of the present invention, will become apparent from the following description, the appended claims and the accompanying drawings disclosing a preferred embodiment of the invention.

BRIEF DESCRIPTION OF THE DRAWINGS

FIG. 1 is a schematic view showing the power brake unit embodying the present invention in its relationship to associated components of a vehicle braking system;

FIG. 2 is a longitudinal sectional view of a power brake mechanism embodying the present invention;

FIG. 3 is a portion of the view shown in FIG. 2 but at an enlarged scale;

FIG. 4 is a transverse sectional view taken on the lines 4—4 in FIG. 2; and

FIG. 5 is an output characteristic curve typifying the type of operation achieved with the power brake embodying the invention.

DETAILED DESCRIPTION

Referring to the drawings, a fluid pressure motor or power brake mechanism generally designated 10 is illustrated embodying the present invention and has particular utility for use in a hydraulic brake system of the type illustrated diagrammatically in FIG. 1. In such systems, hydraulic fluid is delivered from a dual master cylinder 12 through lines 14 and 16 to brake actuators 17 and 18 which function to apply the brakes at the front and rear wheels, respectively, of the vehicle. These components are of conventional construction and their operation and use is so well known in the art that a detailed description is not required for a full understanding of the invention.

The power brake unit 10 embodying the present invention and which actuates the master cylinder 12 includes a housing 22 having a rear housing section 24 and a front housing section 26. As best seen in FIG. 2, the rear housing section 4 incorporates a pressure responsive movable wall unit 28 and the front housing section 26 incorporates a pressure responsive movable wall unit 30. The rear wall unit 28 and front wall unit 30 respond to pressure differentials acting thereon to move an output member 32 which actuates the master cylinder 12 that may be conveniently mounted on the housing assembly 22 in the relationship shown in FIG. 1. The pressure differentials acting on the wall units 28 and 30 are under the control of separate valve means generally designated 34 and 36, respectively. The valve means 34 and 36 are actuated by manual means including a link or output member 38 which is connected to a conventional brake pedal 40.

In the illustrated embodiment of the invention, the power brake unit 10 is of the vacuum suspended type; that is, in the brake released condition illustrated in FIG. 2, vacuum exists in chambers 42 and 44 formed in the rear housing section 24 at opposite sides of the movable wall unit 28 and also in the chambers 46 and 48 formed in the front housing section 26 on opposite sides of the movable wall unit 30. With vacuum in all of the chambers, the movable wall units 28 and 30 remain stationary. To actuate the power brake unit 10 atmospheric air is admitted to the chambers 42 and 46 and since vacuum exists in the forward chambers 44 and 48, the resulting pressure differential on the wall units 28 and 30 causes both of the wall units to move to the left and move the output member 32 to displace hydraulic fluid from the dual master cylinder 12 through the lines 14 and 16 to the brakes of the vehicle.

The source of vacuum for the power brake unit 10 may be provided in a conventional manner by placing the intake manifold of an internal combustion engine in communication with an inlet element 52 mounted in the wall of the rear housing section 24 and a similar inlet valve element 54 mounted in the wall of the front housing section 26. It also is conventional to place check valves (not shown) in the lines leading from the intake manifold to the inlet elements 52 and 54 so as to prevent loss of vacuum in the power brake unit 10 in the event the engine of the vehicle should stop operating or, under various operating conditions in which the source of vacuum becomes inoperative.

The rear housing section 24 of the power brake unit 10 includes a rear housing member 56 and a forward housing member 58 which may be joined together in fluid-tight relationship by a clamp band 60 which engages flanges 62 formed on the outer circumference of the rear housing member 56 and front housing member 58, respectively. The rear housing member 56 may be rigidly mounted in a conventional manner to a wall (not shown) within the engine compartment of a vehicle in a position for connection to the brake pedal 40.

The front housing section 26 includes a rear housing member 64 and a forward housing member 66 which are joined together in fluid-tight relationship in the same manner as the housing members 56 and 58 of the rear housing section by means of another clamp band 60 which engages the circumferential flanges 62 formed on the housing members 64 and 66.

The rear housing 62 of the forward section 24 is connected in abutting relationship to the forward housing member 58 of the rear housing section 25 and is held in position by means of straps 68 having opposite ends rigidly connected as by welding to the housing members 58 and 64, respectively.

The front housing members 66 of the front housing section 26 is provided with studs 70 by which the dual master cylinder 12, shown in FIG. 1, may be mechanically connected directly to the housing member 66 for actuation by the output member 32.

The movable walls 28 and 30 each include a pair of disc-shaped plates 76 and 78 and an annular diaphragm 80. The beaded outer edge 82 of each of the diaphragms 80 is clamped between the flanges 62 provided on the housing members 56, 68 and 64, 66. The beaded inner edge 84 of each of the diaphragms 80 is clamped between the associated disc plates 76 and 78 which may be permanently fastened together as by spot welding. The inner portions of the plates 76 and 78 are provided with diverging flange portions 86 and 88, respectively, and similar control hubs generally designated 90 and 91 are provided which are mounted between and carried by the flange portions 86 and 88 as seen in FIG. 3, in the rear and front housing sections 24 and 26, respectively. A sealing ring 92 is provided around the periphery of each of the control hubs 90 and 91 to engage the corresponding flange portion 86 to prevent leakage between the chambers 42 and 44 in the rear housing section 24 and between the chambers 46 and 48 in the front housing chamber 26.

As best seen in FIG. 3, the control hub assembly 90 in the rear housing section 24 includes a guide member 96 and a cup-shaped hub member 98. The guide member 96 is mounted on the cup-shaped hub member 98 and a gasket 100 is provided so that the guide member 96 and the hub member 98 are sealed together in fluid tight relationship. The hub member 98 has a rearwardly extending tubular portion 102 which is supported for sliding movement in fluid tight relationship to a bearing and seal assembly 104 also in fluid tight relationship in an opening in the rear housing member 56. The guide member 96 includes a tubular portion 106 which projects coaxially with and in the opposite direction from the tubular member 102. The tubular portion 106 is supported for sliding movement in a combined seal and bearing assembly 108 carried in a tubular member 110 forming part of the control hub assembly 91 in the forward housing section 26.

The control hub assembly 91 associated with the forward housing section 26 includes a guide member 116 mounted on a cup-shaped hub member 118 with a gasket 100 disposed therebetween to provide a fluid tight sealing relationship. As seen in FIG. 2, the guide member 116 is provided with a centrally disposed tubular portion 120 in which is mounted the output push rod 32, the rod 32 being retained by an O-ring 122 which does not engage the internal wall of the guide member 116 so that atmospheric air is permitted to flow past the O-ring 122. The internal bore of the tubular portion 120 is provided with a plurality of longitudinal extending slots 124, only one of which is shown, which permit atmospheric air to enter the tubular portion 120 and pass the O-ring 122 to enter the cavity formed by guide member 116 and hub portion 118.

The output push rod 32 which is slidably supported in the tubular portion 120 is provided with a threadably adjustable head 126 whereby the effective length of the push rod may be adjusted as desired for cooperation with the dual master cylinder 12.

The periphery of the left, or forward end of the tubular portion 120 is supported for sliding movement in a combined seal and bearing assembly 132 which, as shown in FIG. 2, is carried in an internally recessed boss portion 134 of the forward housing member 66. The boss portion 134 also functions as a guide for one end of a return coil spring 136, one end of which bears against the inner surface of the forward housing member 66 while the other end bears against the guide member 116.

The rearwardly extending tubular portion 110 of the forward control hub assembly 91 is supported for sliding movement in a bearing 142 which is best seen in FIG. 3 and which has an annular flange portion 144 disposed between the housing member 64 of the forward housing section 26 and the housing member 58 of the rear housing section 24 and is rigidly connected in fluid-tight relation thereto by means of welding or the like. The bearing member 142 is provided with a seal 146 which engages the outer surface of the tubular member 120 to maintain a fluid-tight but sliding connection.

It will now be noted that the forwardly extending tubular portion 120 of the guide member 116, the tubular member 110, the tubular portion 106 of the guide member 96 and the tubular member 102 are all supported in axial alignment relative to each other.

The control hub assemblies 90 and 91 have identical configurations and as seen in FIG. 4, showing the control hub assembly 91, the configuration is generally rectangular in transverse cross-section adjacent to the juncture of the guide member 116 and the cup-shaped hub portions 118. The flanges 88 on each of the plates 78 do not engage the entire circumferences of the associated control hub assemblies 90 and 91 and consequently open communication is effected between opposite sides of the flange portions 88. The only communication between chamber 44 and 42 in the rear housing section 24 and between chamber 48 and 46 in the front housing section 26 at the opposite sides of the movable walls 28 and 30, respectively, is through a plurality of passageways which are similarly formed in each of the control hub assemblies 90 and 91. These are radially extending passageways 158 and 160 and a plurality of longitudinally extending passageways 162 and 164. Communication between chamber 44 and 42 at opposite sides of the power wall 28 of the rear housing section and between chamber 48 and 46 at opposite sides of the power wall 30 of the forward housing section 26 is afforded through the passageways 158, 162, 164 and 160 under the control of the rear valve assemblies 34 and the forward valve assemblies 36 associated with the rear and forward sections 24 and 26, respectively.

As seen in FIG. 3, the vavle means 34 for controlling the rear power brake section 24 of the power brake unit 10 includes an annular valve element 172 formed of resilient material and having an annular flange portion 174 which affords a sealing surface adapted to engage the annular end 175 of a tubular portion 176 forming part of the hub 90. The end 175 functions as one seat for the valve element 172. The right end portion of the annular valve element 172 engages the internal wall of the tubular portion 102 of the hub assemlby 90 in fluid tight sealing relationship, the valve element 172 being retained in position by a combined valve and spring retainer 177 having a press fit in the bore of the tubular portion 102. The bore of the tubular portion 102 is open to atmospheric pressure through filter 180.

The flange portion 174 of the valve element 172 is biased towards the seat 175 by a spring 178 one end of which bears against the flange portion 174 while the opposite end bears against an internally projecting rib 181 provided on the valve and spring retainer 177.

A plunger 182 is slidably mounted within the bore of the tubular portion 176 and is maintained in sealing engagement with the internal wall of the latter. The right end of the plunger 182 forms an annular valve seat 184 concentric with the valve seat 175 and adapted to engage the flange 174 of the valve element 172. The plunger 182 is provided with an internal bore at one end which receives the ball shaped end 186 of the push rod 38 which has its opposite end connected to the brake pedal 40.

With the flange portion 174 of the valve element 172 in engagement with the annular valve seat 184, atmospheric air is prevented from entering and passing beyond this point in the brake unit 10. When the plunger 38 moves the plunger 182 toward the left, the spring 178 urges the valve flange 174 toward the left keeping it in engagement with seat 184 until the flange 174 engages the seat 175 which is effective to seal communication between the chambers 42 and 44. As the plunger 182 moves to the left an additional increment, the seat 184 disengages from the valve flange 174 thereby permitting atmospheric air to flow through the passages 164 and 160 and to enter the rear chamber 42 which develops a differential pressure across the power wall 28 tending to move it to the left as viewed in FIG. 2.

A reaction mechanism generally designated 190 is provided in the hub assembly 90 and includes a pair of levers 192 operable to resist movement of the input push rod 38 and the brake pedal 40 in a substantially direct and uniform ratio to the force developed by differential pressure acting on the power wall 28. Movement of the power wall 28 in response to differential pressure and movement of the plunger 182 in response to manual effort on the brake pedal 40 is transmitted through the reaction mechanism 190 to an output push rod 196. The output push rod or output member 196 is slidably mounted within the tubular portion 106 which extends from the guide member 96 for a purpose to be explained hereinafter.

The pair of levers 192 of the reaction mechanism 190 are identical to each other, each being substantially rectangular as viewed in all directions. The levers 192 are disposed in radially and have their outer ends supported for tilting movement on shoulders 198 formed within the cup-shaped portion 98 of the hub assembly 90. The inner ends of the levers 192 are adapted to engage the adjacent end of the plunger 182. In the position illustrated in FIG. 3, the radially inner ends of the levers 192 are disposed in spaced relationship with respect to the end of the plunger 182 and are biased toward the left by a pre-loaded, low rate spring 199, one end of which bears against the inner ends of the levers 192 and the other end of which bears against an inner wall of the cup-shaped hub portion 98. The levers 192 engage one side of a substantially flat bridge member 200, the opposite side of which engages the adjacent end of the output rod or member 196. The levers 192 and the bridge 200 are encapsulated and located within the control hub 90.

Upon movement of the plunger 182 to the left as viewed in FIG. 2, a differential pressure is created on the rear power wall 28 under the control of the valve means 34 to cause leftward movement of the power wall 28. Such movement of the wall causes the levers 192 to pivot about the upper and lower ends 201 of the bridge member 200 so that the inner ends of the levers 192 moves to the right, compressing the spring 199 until the levers come into engagement with the plunger 182. Thereafter the force delivered to the output member 196 is the sum of the forces delivered by the force of the power wall 28, through the outer end of the levers 192 and the force applied to the plunger 182 from the foot pedal 40 to the inner ends of the levers 192. The proportion of the force due to the power wall and to the manual foot effort is distributed to the bridge member 200 and to the output member 196 in a ratio proportional to the length of the levers 192 and the location of the fulcrum 201 relative to the points at the ends of the levers where forces are applied. In the illustrated embodiment, the ratio is approximately 4 to 1, that is, the distance from the inner ends of the levers 192 to the pivot or fulcrum 201 at the outer ends of the bridge member 200 is 4 times as long as the distance from the pivot 201 to the point of abutment of the lever with the shoulder 198. By way of example, for every pound of force from the foot pedal 40, 4 pounds of force result from differential pressure on the power wall and the sum of the forces is five pounds which is transmitted to the output member 196. The one pound of force required at the pedal represents the reaction or feel by which the operator can sense the degree of actuation.

The valve means 36 associated with the power wall 30 in the forward section 26 is actuated by the output member 196 of the rear power brake section 24. The valve means 36 disposed in the tubular member 110 for controlling fluid flow in the passages between the chambers 46 and 48 at opposite sides of the power wall 30 in the forward housing section 26 is similar construction and operation, in most respects, to the valve means 34 described above and corresponding parts have been identified with identical numerals. The forward valve element 172 is secured in position within the tubular member 110 by the combination seal and bearing 108, the internal bore of which is provided with a seal 210 which slidably engages the outer surface of the tubular portion 106 of the rear control hub assembly 90. The output member 196 which is slidably mounted within the tubular portion 106 has an end portion provided with a threaded element 212, the left end of which as viewed in FIG. 3, is adapted to engage a plunger 214 which is different in construction than the plunger 182 associated with the rear valve assembly 34. The plunger 214 is provided with a longitudinally extending bore 216 which communicates with a longitudinal passage 218 radially offset from the axis of the bore 216 to provide fluid passage between opposite ends of the plunger 214. The right end of the plunger 214, as viewed in FIG. 3, has an annular rib which forms an inlet valve seat 220 for engagement with the valve element 172 and which corresponds to the inlet valve seat 184 of the valve assembly 34 in the rear housing section 24. The longitudinal passage 216 communicates with a radial passage 222 to insure fluid communication between the interior of the hub assembly 91 and the passage 216. A spring 224 is disposed in the longitudinal passage 216 with one end against a stepped portion in the bore 216 and the opposite end against the levers 192 which serves to maintain the latter in spaced relationship to the plunger 214 when the power brake unit 10 is in the normal, non-operating position as shown in FIG. 2. Atmospheric air is admitted to the area of the valve assembly 36 by way of the longitudinal passages 124 in the tubular member 120 around the sides of the bridge member 200 and the levers 192 (as seen in FIG. 3) and through the longitudinal passage 216 and 218. Engagement of the flange portion 174 with the valve seat 220 under the urging of a spring 178a closes off further communication to the front housing section 26. Upon movement of the output member 196 to the left, as viewed in FIG. 2 or 3, the plunger 214 is also moved to the left to engage the annular valve seat 176 which isolates the chambers 46 and 48 from each other. Further leftward movement causes the valve seat 220 to move out of engagement with the flange 174 and to permit atmospheric air to enter the chamber 46 to create a differential pressure on the power wall 30 which causes the latter to move to the left.

The reaction mechanism disposed in the control hub assembly 91 includes parts identical to the parts in the reaction mechanism in the hub assembly 90 except that, in the former, a spring 224 acts between the levers 192 and the plunger 214 to hold the levers 192 separated from the plunger 214 in the released condition of the power brake unit 10 shown in FIG. 2. In the hub assembly 90, a spring 199 acts between the cup-shaped portion 98 and the levers 192 to maintain the latter in spaced relationship to the plunger 182.

In a release condition of the brakes, the power unit components are disposed in the position shown in FIG. 2 with the power walls 28 and 30 in their rearwardmost or rightward position. At this time, the valve seat 184 of the rear valve assembly 34 and the valve seat 220 of the forward valve assembly 36 are closed and the corresponding valve seats 175 and 220 of the valve assemblies 34 and 36 are open to free fluid passage. This condition of the valve assemblies 34 and 36 permits passage between the chambers 44 and 42 through the passageways 158, 162, 164 and 160. In like manner, the chamber 48 in the forward housing section 26 which has its own connection to a source of vacuum, is in communication with the chamber 46 through similar passages 158, 162, 164 and 160. The chamber 42 is isolated from atmospheric pressure which enters the tubular member 102 from the right by the seating of the valve flange 174 on the valve seat 184. Chamber 46 is isolated from the atmosphere which enters from the left through the passages 124, 216, and 218 by seating of the valve flange 174 on the valve seat 220. Consequently, under these conditions, vacuum is present in the chambers 42, 44 from one source of vacuum and in the chambers 46 and 48 from another source of vacuum and the power walls 28 and 30 remain stationary. At the same time, the radially inner ends of the levers 192 are spaced from the plungers 182 and 214 a distance slightly greater than the spacing between the valve flange 172 and its associated valve seats 175 in the rear and forward housing sections 24 and 26, respectively.

Initial movement of the input member 38 to the left in response to manual effort applied to the brake pedal 40 causes movement of the input member to compress a light return spring 228 acting between rib 181 and a shoulder on the input member 38. This causes the plunger 182 to move and permits the valve flange 174 to move to the left under the influence of spring 178 and engage the valve seat 175 on the tubular portion 176 to isolate the chambers 42 and 44 from each other. Under these conditions, the valve assembly 34 is disposed in a lap position; that is, an intermediate position in which any additional movement of the plunger 38 will result either in actuation of the power wall 28 or in returning the valve flange 174 to its normal position. During such initial movement, the left end of the plunger 182 remains in spaced relationship with the radially inner ends of the levers 192.

Upon additional leftward movement of the input member 38, the valve seat 184 moves away from the sealing surface afforded by the valve flange 174 so that atmospheric air is permitted to enter the rear chamber 42 through the passageways 164 and 160 and, at the same time, the atmospheric air is isolated from the forward chamber 44. Since vacuum pressure exists in chamber 44, the introduction of atmospheric air to the chamber 42 creates a pressure differential which causes the power wall 28 to move toward the left as viewed in FIG. 2. Such initial movement of the power wall is effective to pivot the levers 192 about the edges 201 of the bridge member 200 so that the radially inner ends of the levers 192 engage the plunger 182. As the power wall 28 moves an additional increment to the left under the influence of differential pressure and as the plunger 182 is maintained in engagement with the levers 192 under the influence of manual effort applied to the input plunger 38, leftward movement is imparted to the output plunger 196 and to the control plunger 214 in the forward hub assembly 91 which causes the valve flange 174 to close on the valve seat 175 in the forward hub assembly 91 and thereafter, to open or move the valve seat 220 out of engagement with the valve flange 174 associated with the valve assembly 36. This permits atmospheric air to enter the chamber 46 through the passages 120, 216 and 218 around the open valve seat 220 and through the passages 162 and 160.

The pressure differential created in the chambers 46 and 48 in the forward housing section 26 causes leftward movement of the power wall 30 which, initially, is imparted to the output member 124 to initiate actuation of the master cylinder so that fluid is displaced in the hydraulic lines to take up lost motion and move the bridge linings to a position just touching the rotating surface to be braked at the wheels of the vehicle.

As the pressure builds up in the master cylinder, the output push rod 32 and the master cylinder resist movement of the power walls 28 and 30 and, as a consequence, the levers 192 in the foward control hub assembly 91 and the levers 192 in the rearward control hub assembly 90 pivot about the edges 201 of the members 200 and the inner ends of the levers 192 engage the left ends of the plungers 214 and 182. The force of the plunger 214 is transmitted through the control rod 196 to the reaction mechanism associated with the rear control hub assembly 90, to the input member 38 and therefrom to the brake pedal 40. The force at the foot pedal 40 required to maintain the valve assemblies 34 and 36 in their controlling relationship may be considered to be the reaction of feel. The reaction force is in direct proportion to the force applied by the power walls 28 and 30. The force applied by the power walls plus the force applied by the foot pedal 40 is the force applied to the output member 32 and therefrom to the master cylinder for applying the brakes.

To increase the output of the master cylinder, that is, the force with which the brakes are to be applied, manual force must be continuously applied to the brake pedal 40. Such additional manual force continues to move the plunger 182 and 214 while the power walls 28 and 30 also continue to move in the same direction.

When the force on the brake pedal 40 is no longer increased but is maintained at a predetermined level, movement of the power walls 28 and 30 without additional movement of the plungers 182 and 214 results in the valve flanges 174 closing the valve seats 176 associated with the valve assemblies 34 and 36 so that the valve assemblies assume their lap position isolating the chamber 42 from chamber 44 and chamber 46 from 48. The valves are therefore in lap condition and the forces applied by the foot at the foot pedal 40 and by pressure differential on the power walls 28 and 30 is in equilibrium with the force existing at the output rod 32 acting on the master cylinder. Additional movement of the foot pedal 40 will reactuate the control valves and increase braking and a release of the foot pedal 40 from the lap condition will close the valve seats 184 and 220 on the valve flanges 174 to isolate atmosphere from the power brake unit 10 and to open communications between the chamber 42 and 44 and between the chamber 46 and 48 to re-establish vacuum permitting the power walls 28 and 30 to move to the right to assume their release position shown in FIG. 2.

In the event of failure to one or the other of the motor housing sections 24 or 26, the remaining section remains operative to apply an output force to the output member 32 for actuating the master cylinder. For example, if the supply of vacuum to the inlet element 54 in the foward housing chamber 26 should be discontinued, the pressure in the chamber 48 becomes equal to atmospheric pressure and, as a consequence, the pressure in chamber 46 is at atmospheric pressure. Subsequent actuation of the valve assembly 36 will not produce a pressure differential on the wall 30. However, actuation of the foot pedal 40 and the valve assembly 34 remain operative to create a pressure differential on the power wall 28 causing its leftward movement and therefore, movement of the output member 196 which in turn is transmitted to the plunger 214 which engages the associated levers 192 in abutment with the bridge member 200. Such movement causes manual movement of the hub assembly 91 and the power wall 30 as well as the output member 124. In other words, fluid pressure differential on the power wall 28 will be operative to effect a power brake actuation under the influence of the rear housing section 24 to mechanically move the power wall 30 and the output push rod 124 which transmits its force to the master cylinder. Under such conditions, one-half of the potentially available power due to differential pressure would be utilized to apply the brakes through the master cylinder to all wheels of the vehicle.

If the source of vacuum to the inlet element 52 in the rear housing section 24 of the power brake 10 should fail, the pressure in the chambers 42 and 44 becomes equal to atmospheric pressure so that a pressure differential is not available to move the power wall 28. Consequently, actuation of the brake pedal 40 causes the input member or plunger 182 to engage the radially inner ends of the levers 192 so that the manual force applied to the brake pedal 40 is transmitted directly to the hub assembly 91, power wall 28 and reaction mechanism 190 to the rod 196 to actuate the valve assembly 36 in the forward housing section 26 in a normal fashion. The resulting differential pressure on the power wall 30 is transmitted in the usual manner to the output member 124 and then to the output rod 32 and to the master cylinder to bring about an actuation of the master cylinder and, consequently, actuation of the brakes at all of the wheels of the vehicle under the influence of approximately one-half of the power available from the power brake unit 10.

If the source of vacuum should fail to both sections of the power brake unit 10 so that no differential in fluid pressure can be created to move the power walls 28 and 30, application of manual effort to the brake pedal 40 will be transmitted through the input member 38 to move the plunger 182 into contact with the radially inner ends of levers 192 to move the bridge member 200 and the rod 196 which causes plunger 214 to engage the levers 192 in the forward hub section 91 and transmit force to the bridge member 200 and to the output rod 32 and from there to the master cylinder for manually applying the brakes. In this instance, the effort applied to the brake pedal 40 manually moves all of the mechanism within the power brake unit 10 to transmit manual force to the master cylinder for power-off brake application. This also is the condition that exists when the power brake unit 10 reaches its runout condition.

The runout condition is one in which the power walls 28 and 30 are exerting their maximum force due to differential pressure and no additional differential in pressure is available. Any braking output to the push rod 32 in addition to the maximum amount supplied by the power walls 28 and 30 must be applied manually to the foot pedal 40.

In the embodiment of the present invention, the forward power brake chamber 26 achieves its runout point first. This occurs because the force at the output member 32 which is acting on the master cylinder is the sum of the force due to pressure differential on the power wall 30 and the output force of the rear section 24 of the power brake 10 acting on the control plunger 214. The two forces are applied to the levers 192 in a ratio of the distance of the opposte ends from the fulcrum formed by the ends 201 on the bridge member 200. Therefore, if each of the power walls is capable of generating one thousand pounds of force and if the ratio of the levers in the reaction mechanism is four to one, this would means that at the time the forward power wall 30 had achieved its maximum output force of one thousand pounds, the rear brake unit would be applying two hundred and fifty pounds of force to the control plunger 214 resulting in a total of 1250 pounds to the output member 32. In like manner, to create two hundred and fifty pounds of force on the input plunger 214, the rear power section 24 would be required to generate approximately two hundred pounds by way of the power wall 28 and fifty pounds by manual force on the input member 38. As a result, eight hundred pounds of force would still be available to be generated by the power wall 28 in the rear chamber 24. This phenomenon can best be understood by referring to FIG. 5 showing the operating characteristic curve of a typical power brake unit in which the power walls are capable of generating equal forces and in which the lever ratios and each of the reaction mechanisms is identical. It should be understood, however, that different sizes of power walls and lever ratios can be used in the reaction mechanism to achieve still other forms of characteristic curves.

Referring now to FIG. 5, there is shown typical operating characteristic curves for the dual booster 10 shown in FIG. 2. Curve OA represents the output in pounds at the output member 32 in terms of the force applied by the operator to the brake pedal 40 when there is no power available for braking. The curve OB represents the output in pounds of force of the power brake unit when only one or the other of the power walls 28 or 30 is under the influence of a differential pressure to produce power braking. At point B, the maximum differential pressure will have been utilized and, as a consequence, any additional braking must be added manually to the foot pedal 40. This is represented by the curve portion BC which, it will be observed, is parallel to the curve OA. The curve OD represents the combined output of both of the power brake housing sections 24 and 26 under the influence of differential pressure in both sections. The point D represents the point at which the full capability of the power wall 30 has been utilized. However, some differential pressure is still available to operate the power wall 28 which is represented by the curve DE. At point E, all of the available differential pressure force has been utilized and a runout point has been reached by the power brake unit 10. Any braking in addition to the force available through the differential power walls 28 and 30 must thereafter be applied manually to the brake pedal 40. Curve EF represents the amount of additive output force resulting at the output member 32 in response to manual force applied to the brake pedal 40. It will be noticed that the curve portion EF is parallel to the curves BC and OA. The curve OBC represents the output of the power brake unit in terms of the manual input at the brake pedal 40 when one or the other of the power brake sections 24 or 26 has failed. It will be observed that, although there has been a failure, at least a portion of the power is available for actuation of the master cylinder.

The curve ODEF in FIG. 5 represents operating characteristics of a power brake unit of the type shown in FIG. 2 in which the ratios of the reaction mechanisms 190 are identical and in which the size of the power walls 28 and 20 are equal and the sources of vacuum pressure at the inlets 52 and 54 are equal. The resulting overall operating characteristic of such a unit is one in which increments of input force in the later stage of operation are effective to produce smaller increments of output force than in the earlier stages of operation. Such a characteristic curve is particularly desirable when utilized with brakes having characteristics such as those known in the art and called self-energized which require less effort in the later stages of actaution than in the earlier stages.

It should be understood that the characteristic curve can take various other forms by changing the ratio of the levers in the reaction mechanism or by changing the size of the power walls 28 or 30.

It will now be seen that a dual chamber power brake mechanism has been provided which employs two sources of differential fluid pressure in such a manner that failure of one or the other sources leaves the portion of the power brake system under the influence of the remaining source of differential fluid pressure operable to apply the brakes. Also, the operating characteristics of the dual power brake mechanism are such that they may be readily varied to accommodate desired performance for various types of brakes.

What is claimed is:

1. In a fluid pressure motor mechanism having first and second housing sections, said first housing section including a first power wall responsive to differential pressure to move from a released to an applied position, a first source of differential pressure fluid, manually movable control means for regulating application of differential pressure to said first power wall, an output member, reaction means operatively connected to said output member, said first power wall and said control means for movement of said output member in response to movement of said first power wall and said control means, said second housing section including a second power wall, a second source of differential pressure separate from said first source, additional control means responsive to movement of said first output member to regulate application of differential pressure to said second wall, an additional output member, and additional reaction means operatively connected to said additional output member, said second power wall and said additional control means for movement of said additional output member in response to movement of said second power wall and said second control means for producing an output force.

2. A fluid pressure motor mechanism in accordance with claim 1 in which one of said control means is responsive in the absence of differential pressure in the associated one of said sources to move the associated one of said output members.

3. A fluid pressure motor mechanism as set forth in claim 1 in which said manually movable control means is operative in the absence of differential fluid pressure from said first source to move said additional control means.

4. A fluid pressure motor mechanism as set forth in claim 1 in which said additional control means is operative in the absence of differential fluid pressure from said second source to move said additional output member.

5. In a power brake unit having first and second fluid tight housings; separate sources of pressure for each of said housings; first and second pressure responsive movable walls in said first and second housing portions, respectively, and forming therewith chambers on opposite sides of each of said walls; first and second control means associated with said first and second wall means, respectively, and controlling the pressure differential acting on said walls; first and second output members; a first reaction means operatively connected to said first wall, said first control means and said first output member and being responsive to movement of said first wall and said first control means to move said first output member, a second reaction means operatively connected to said second wall, said second control means and said second output member to move said second output member in response to movement of said second power wall and said second control means; and an actuating member connected to said first control means to move the latter.

6. The combination set forth in claim 5 in which said first and second reaction means each include lever elements engageable with the associated one of said walls, control means and output members.

7. The combination set forth in claim 5 in which said walls are movable independently of each other in response to separate sources of fluid pressure acting thereon.

8. The combination set forth in claim 5 in which one of said control means is responsive in the absence of differential pressure in the associated one of said sources to move the associated one of said output members.

9. The combination set forth in claim 5 in which said actuating member is operative in the absence of differential fluid pressure from said first source to move said second control means.

10. The combination set forth in claim 5, in which said second control means is operative in the absence of differential fluid pressure from said second source to move said second output member.

11. In a fluid pressure motor mechanism having first and second motor means, each of said motor means having a housing, a pressure responsive movable wall in said housing, a source of fluid pressure, a control means carried by said wall and being movable relative thereto for controlling the application of fluid pressure from said source to said wall, an output member movable in response to movement of said wall, said wall and output member associated with one of said motor means being movable independently of said wall and output member associated with the other of said motor means, and actuating means for moving said control means for effecting movement of said output members of said first and second motor means, said output members of said first and second motor means being movable by said walls upon movement of said actuating means in the absence of fluid pressure in one of said sources.

12. In a fluid pressure motor mechanism having a pair of adjacent housing portions, a pair of fluid pressure responsive movable walls in each of said housing portions, respectively, a separate source of fluid pressure for each of said housing portions, a pair of control valve means separately connected to each of said sources for controlling fluid pressure to each of said housing portions, respectively, an input member movably supported relative to one of said housing portions, an output means movably supported relative to the other of said housing portions, connecting means operatively connecting said input member to both of said control valve means for actuating the latter to apply differential fluid pressure to both of said walls and operatively connecting said output means to said walls for movement of said output means in response to movement of either of said walls, said walls being movable independently of each other in response to separate sources of fluid pressure acting thereon.

* * * * *